Sept. 18, 1928.
C. S. JOHNSTON
1,684,398
DISK WHEEL
Filed March 19, 1925
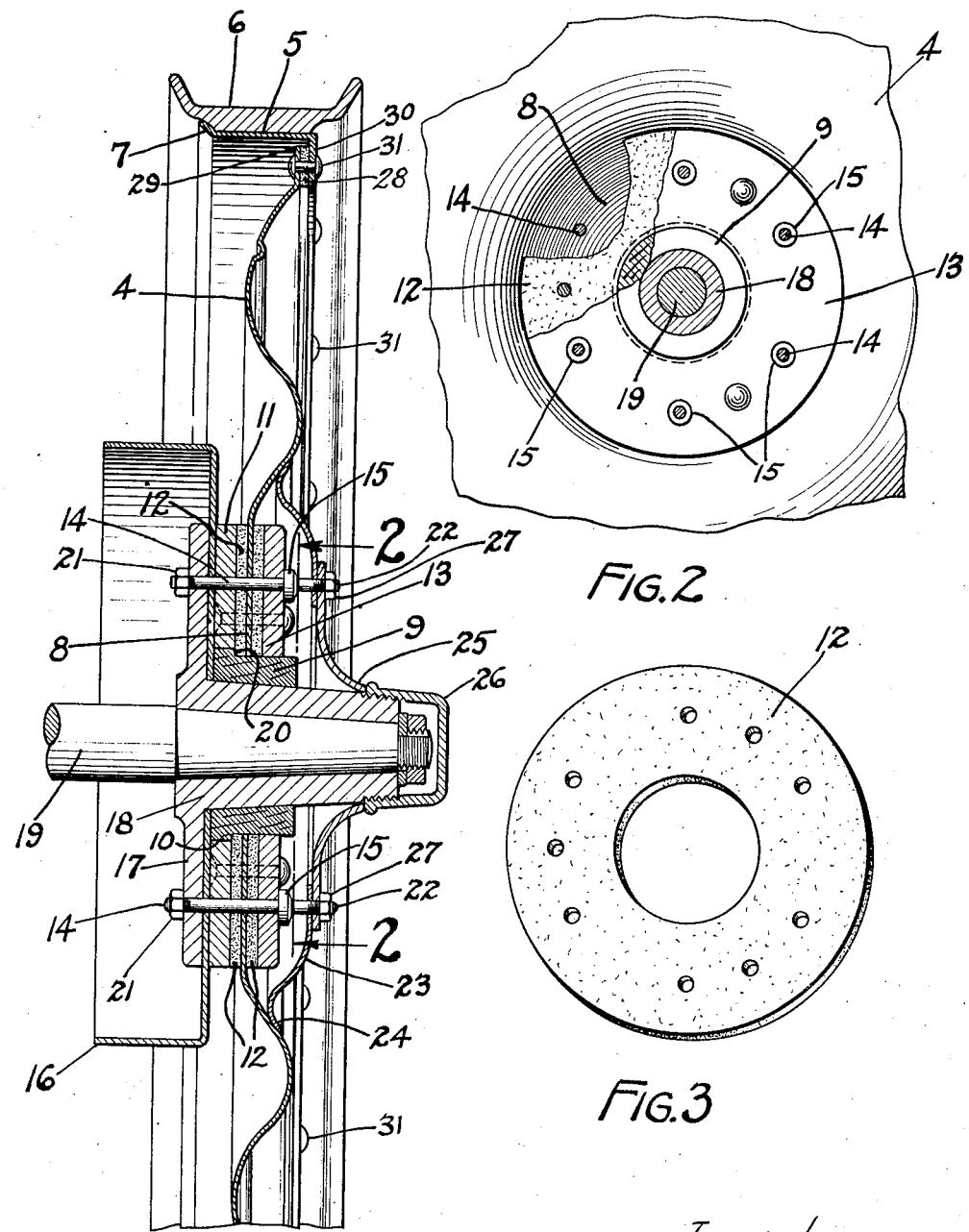
Inventor
CLARENCE S. JOHNSTON
By Paul, Paul & Moore
ATTORNEYS Patented Sept. 18, 1928.

1,684,398

UNITED STATES PATENT OFFICE.

CLARENCE S. JOHNSTON, OF GLENDIVE, MONTANA.

DISK WHEEL.

Application filed March 19, 1925. Serial No. 16,716.

This invention relates to new and useful improvements in disk wheels particularly adapted for use on vehicles, especially automobiles, and more particularly relates to such a wheel having an auxiliary hub adapted to be fitted to the usual main hub of a standard automobile wheel, thereby greatly reducing the amount of labor ordinarily required in equipping an automobile or other vehicle with disk wheels, with a resultant decrease in cost.

A further object of the invention is to provide a disk wheel having a sound-deadening means incorporated in the construction thereof, which functions to absorb and eliminate objectional and disturbing noises generated in the wheel when traveling at relatively high speeds.

A further and more specific object of the invention is to provide a disk wheel having flexible sound-deadening members engaging opposite sides of the central portion of the wheel disk thereby to damp or absorb all vibration of the wheel and thus to render it quiet-running.

A further object is to provide a disk wheel having the tire rim-supporting or felloe flange or member independently formed and secured to the wheel disk, and between which flange and disk a sound-deadening means is interposed for the purpose of absorbing objectional noises or sounds generated in the wheel.

The particular object of the invention therefore is to provide an improved disk wheel.

Other objects of the invention will appear from the following description and the accompanying drawings and will be pointed out in the annexed claims.

In the drawings there has been disclosed a structure designed to carry out the various objects of the invention but it is to be understood that the invention is not confined to the exact features shown as various changes may be made within the scope of the claims which follow.

In the drawings:

Figure 1 is a sectional elevation of a portion of an automobile wheel showing the invention applied thereto;

Figure 2 is a sectional view on the line 2—2 of Figure 1, partially broken away to show the relative position of the parts; and Figure 3 is a perspective view of one of the flexible sound-deadening washers or members removed from the wheel.

The novel disk wheel featured in this invention preferably comprises a circular metallic disk 4 having a peripheral flange 5 adapted to provide a seat for the usual tire rim 6 mounted thereon. The marginal edge of the flange 5 is preferably bent outwardly to provide an abutment 7 for the rim 6 when mounted on the disk.

An important feature of this invention resides in the novel means provided for deadening or eliminating, by absorption, objectionable and undesirable noises which may be generated in the metallic disk when the wheel is traveling at certain speeds.

As shown in Figure 1, the disk 4 is provided with a flattened central portion 8 which is apertured to receive a central sound-deadening member or hub 9, preferably of wood having an outwardly projecting peripheral flange 10, preferably integrally formed thereon. The means provided for absorbing the vibrations of the metallic disk 4 resides in the provision of flexible washers or disks 12, preferably of fabricated material, which are mounted on the auxiliary sound-deadening hub 9 and adapted to engage opposite sides of the central portion 8 of the disk 4. An annular plate or clamping member 13 is also mounted on the hub 9 and this clamping member is apertured to receive a series of studs or bolts 14, preferably having integral flanges or heads 15 provided thereon adapted to engage the clamping plate 13, as shown in Figure 1. A spacing washer 11 is peripherally mounted on the flange 10 of the hub 9, and this washer is similarly apertured to receive the studs 14. When the disk 4 has been positioned upon the auxiliary hub 9 between the sound-deadening members 12, the studs 14 will be inserted through aligned apertures provided in the several parts, thence through the wall of the usual brake drum 16 and through the flange 17 usually provided on the main hub 18 mounted on the axle 19. Threaded nuts 21 are mounted on the ends of the studs 14 adapted to securely clamp the various parts together for operation as a unit. As shown in Figure 1, the thickness of the spacing washer 11 is substantially equal to the thickness of the peripheral flange 10 of the sound-deadening hub 9 so that when the nuts 21 are mounted on the studs 14, the several parts may be securely clamped together. The annular shoulder 20 provided on the hub 9 by means of the flange 10 will engage the adjacent sound-deadening washer 12 thereby retaining it in proper position upon the main hub 18.

Each stud 14 is preferably provided with an oppositely extending end-portion 22 adapted to receive an apertured saucer-like finishing plate 23 which has its outer curved edge portion 24 bearing against the surface of the irregularly shaped disk 4. Threaded nuts 27 are preferably mounted on the end portions 22 for securing the plates 23 and 25 to the wheel. The gap between the bore of the saucer-like finishing plate 23 and the periphery of the main hub 18 is closed by means of the curved hub plate 25 which is provided with a central aperture to receive the end of the hub 18. The usual hub cap 26 is received in threaded engagement with the end of the hub 18 and is adapted to engage the outwardly projecting edge of the plate 25, thereby to present a neat appearance to the wheel when mounted on the hub 18.

When it is desired to demount or remove the wheel from the hub 18, the cap 26 will first be removed from the end of the hub, after which the latter may be removed from the axle 19. The nuts 21 are then removed from the inner ends of the studs 14 after which the sound-deadening hub 9 carrying the disk, sound-deadening washers 12, finishing plate 23 and hub plate 25 may be removed as a unit, from the main hub 18. The hub 9 is preferably provided with a tapered bore to adapt it to snugly fit the tapered periphery of the hub 18. By the use of the auxiliary sound-deadening hub 9 this novel disk wheel may readily be fitted to front or rear wheels, of standard construction, by simply boring the hub to fit the particular size of hub upon which it is to be mounted. Also by its use in conjunction with the fabricated washers 12, the wheel will be rendered substantially sound-proof. The various parts mounted on the hub 9 are preferably snugly fitted thereto so that when the disk 4 is removed from the main hub 18, the sound-deadening hub 9 will be removed therewith as a unit. If desired, however, means (not shown) may be provided for securing it thereto.

It is to be understood that the main hub 18, flange 17 and brake drum 16 are of ordinary construction, such as are commonly employed in the construction of automobile wheels. To replace the old or spoke type of wheel with a disk wheel, it is only necessary to remove the usual hub plate 25 and the spokes from the main hub 18, after which the auxiliary hub 9 of the disk wheel may be fitted to the hub 18 in place thereof, thereby providing a very substantial and neat-appearing disk wheel.

To further render the wheel noiseless and quiet-running, a secondary sound-deadening means is preferably provided in the outer portion of the wheel adjacent the tire rim flange 5. As shown in Figure 1, such means preferably consists in the provision of a sound-deadening ring or member 28 which is interposed between the outer marginal edge-portion 29 of the disk 4 and the inwardly projecting flange 30 of the tire rim-supporting flange 5. The parts may be securely fastened together for operation as a unit by means of the rivets 31.

The sound-deadening washers or plates 12 and the outer member 28 used in the construction of this novel disk wheel may be made of any suitable material which will absorb any vibration which may be generated in the steel disk 4 when the wheel is traveling at relatively high speeds. It is also to be understood that the number, shape and size of the sound-deadening members used in the construction of each wheel may be varied, as required, to accomplish the desired results without departing from the invention.

Having thus described my invention, what I claim as new and desire to secure by Letters-Patent is:

1. In a disk wheel, the combination with a peripherally flanged hub having a central bore, of a circular disk forming the body of the wheel, mounted thereon, annular clamping members also mounted on the hub to secure the disk thereto, flexible means interposed between the clamping members and the disk adapted to absorb vibration of the wheel when in motion, thereby to render it noiseless, and means for securing together said flexible means, clamping members and disk.

2. In a disk wheel, the combination with a main hub adapted to be mounted on an axle, of an auxiliary hub mounted on the main hub, said auxiliary hub being of sound-absorbing material and having a peripheral flange formed thereon to provide an annular seat, a centrally apertured disk mounted on said auxiliary hub, sound-deadening members also mounted on the auxiliary hub adapted to engage opposite sides of the central portion of the disk, thereby to absorb vibration of the wheel when in motion, one of said members engaging said annular seat and means for securing the auxiliary hub, sound-deadening members and the disk to said main hub.

3. In a disk wheel, the combination with a main hub having an annular outwardly projecting abutment flange thereon, of an auxiliary sound-deadening hub member secured to the main hub, said auxiliary hub also having a radially projecting flange adapted to abut the flange on the main hub, a circular wheel disk mounted on the auxiliary hub, sound-deadening members also mounted on said auxiliary hub and arranged to engage opposite sides of the central portion of the disk, and means for securely clamping the disk and said members to the radially projecting flange of the main hub.

4. A wheel comprising a main hub, a wheel-disk, an auxiliary hub of sound-absorbing material adapted to receive the disk and mounted on the main hub, sound-deadening members mounted on the auxiliary hub on opposite sides of the disk, apertured clamping members also mounted on said auxiliary hub, flanged studs mounted in the clamping members and passing through alined apertures in the sound-deadening members, disk and main hub flange thereby to clamp said parts securely together for operation as a unit, said studs having extensions adapted to receive a finishing plate and hub plate, to reinforce and to complete the formation of the central portion of the wheel.

5. In a disk wheel, the combination with a peripherally flanged hub, of a disk mounted thereon, clamping members for securing the disk thereto, a felloe flange peripherally secured to the disk, sound-deadening means interposed between the disk and the felloe flange and also between the disk and clamping members adapted to absorb vibration of the wheel when in motion, and means for operatively securing together said parts.

6. In a disk wheel, the combination with a peripherally flanged main hub, of an auxiliary sound-absorbing hub member mounted thereon, a circular disk forming the body of the wheel, mounted on the auxiliary hub, a felloe flange peripherally secured to the disk, clamping members mounted on the auxiliary hub, an annular sound-deadening member interposed between the felloe flange and the disk, sound-deadening members also interposed between the central portion of the disk and the clamping members adapted to absorb vibration of the wheel when in motion, thereby to render it noiseless, and means for operatively securing together said parts.

In witness whereof, I have hereunto set my hand this 10 day of March 1925.

CLARENCE S. JOHNSTON.